(12) United States Patent
Hanson

(10) Patent No.: US 6,626,441 B1
(45) Date of Patent: Sep. 30, 2003

(54) BICYCLE SKI LINK ASSEMBLY

(75) Inventor: Matthew C. Hanson, Playa del Rey, CA (US)

(73) Assignee: Winter-X-Bike, Inc., Hermosa Beach, CA (US)

( * ) Notice: Subject to any disclaimer, the term of this patent is extended or adjusted under 35 U.S.C. 154(b) by 0 days.

(21) Appl. No.: 09/908,406

(22) Filed: Jul. 18, 2001

(51) Int. Cl.[7] ............................................... B62K 13/00
(52) U.S. Cl. ..................................... 280/7.14; 280/7.17
(58) Field of Search ............................. 280/7.12, 7.14, 280/7.15, 12.1, 7.17, 7.16

(56) References Cited

U.S. PATENT DOCUMENTS

| | | | |
|---|---|---|---|
| 613,940 A | * 11/1898 | Ringborg | 280/12.1 |
| 691,826 A | * 1/1902 | Trudelle | 280/12.1 |
| 737,372 A | * 8/1903 | Dupras | 280/12.1 |
| 1,209,398 A | * 12/1916 | Converse | 280/12.1 |
| 1,268,229 A | * 6/1918 | Frank | 280/12.1 |
| 1,337,396 A | 4/1920 | Eiselt | |
| 3,884,484 A | 5/1975 | Ulhyarik | |
| 4,027,891 A | 6/1977 | Frame | |
| 4,168,841 A | 9/1979 | Uhlyarik | |
| 5,102,153 A | 4/1992 | Rhode | |
| D406,627 S | 3/1999 | Pike | |

* cited by examiner

Primary Examiner—Avraham Lerner
(74) Attorney, Agent, or Firm—Brown Raysman Millstein Felder & Steiner, LLP

(57) ABSTRACT

A bicycle ski link assembly 10 includes front and rear ski link brackets 20, 30, and left and right foot pegs 50, 52. Each of the two ski link brackets 20, 30 has an upper portion 22, 32 and a lower base portion 26, 36. The upper portion 22, 32 of each ski link bracket 20, 30 contains a transverse axle hole 24, 34. Further, the lower base portion 26, 36 of each ski link bracket 20, 30 contains a set of ski member holes 28, 38. The ski link brackets 20, 30 and the foot pegs 50, 52 attach to the frame 70 of a standard bicycle which includes a front wheel mount 72, a rear wheel mount 74, and a wheel cranks mount 76. In order to convert the standard bicycle into a snowbike 60, the front and rear wheels are removed from the front and rear wheel mounts 72, 74, and the wheel cranks are removed from the wheel cranks mount 76. The ski link brackets 20, 30 are then secured to the frame 70 by attaching the upper portions 22, 32 of the ski link brackets to the wheel mounts 72, 74 of the frame by inserting the axles 73, 75, through the axle holes 24, 34 in the ski link brackets. The foot pegs 50, 52 are then attached to the wheel cranks mount 76.

22 Claims, 3 Drawing Sheets

BICYCLE SKI LINK ASSEMBLY

FIELD OF THE INVENTION

This invention relates generally to a bicycle ski link assembly and, more particularly, to a ski link assembly that is configured for converting a standard bicycle into a snowbike that is capable of traveling across snow-covered terrain.

BACKGROUND OF THE INVENTION

There are hundreds of thousands of cyclists in this country, and still more worldwide. Mountain biking and BMX (bicycle motocross) racing already are extremely popular, and excitement in this area is continuing to grow. However, a large portion of cyclists (particularly those who live in colder and/or harsher climates), are forced to put away their bikes every year for several months, when the ground is covering with snow. Some of these people have spent thousands of dollars on state of the art, high-tech, virtually unbreakable, lightweight bikes that cannot be used during the winter when the ground is covered with snow. Many of these same people also shift their outdoor activities during this time from cycling to traditional winter sports, such as skiing and snowboarding.

Sports equipment manufacturers, particularly in Europe, have made efforts to entice cyclists to snowy terrain by offering snowbikes, which generally consist of two skis one behind the other affixed to a frame, the frame having steering handlebars associated with the forward, usually shorter-length ski and a low seat affixed to the rearward, usually longer-length ski. The rider sits on the seat but wears additional short skies on each foot in order to balance himself on the snowbike as it moves across the snow. One such snowbike, typically found in Europe, is referred to as a "skibob." Indeed, in Europe there is a World Cup racing circuit for skibobs that includes downhill, slalom and giant slalom. In the United States, however, skibobs have not acquired popularity are almost never seen on the ski slopes.

One main reason for lack of popularity of the sport is that prospective snowbikers are discouraged by the high cost of the specialized equipment needed to pursue the activity. A skibob is a relatively expensive item, with prices for currently available skibobs in the range of $600 to $2,500. A sports enthusiast who has already spent several thousand dollars on a state-of-the-art mountain bike and several thousand dollars on the latest skis and/or snowboard, may be unlikely to purchase another high cost item such as a skibob. Moreover, skibobs tend to be insubstantial or flimsy in construction which, as a practical matter, limits use of the equipment to downhill riding.

Prospective snowbikers might be more attracted to the sport if a piece of equipment were available to them which would allow a greater range of activities than riding straight down a snow-covered hill. For example, potential consumers might be attracted to the sport if a snowbike existed that would enable more elaborate maneuvers and more challenging riding, similar to the variety of experiences which are available to a snowboarder. As prior snowbikes like the skibob generally must be used with skis on the feet of the rider, it is easy to appreciate, that the rider's capacity to engage in any sort of "fancy" riding such as aerial tricks and the like would be inhibited. Still more customers might develop if a snowbike could be at their disposal for a modest investment in contrast to the expense associated with the purchase of a currently available skibob.

Similarly, more enthusiasts might be lured to the sport if a person could snowbike on snow-covered terrain in a manner similar to that in which a person can use a standard bicycle on non-snowy terrain. For example, and in part owing to lightweight but nonetheless extremely sturdy and durable construction, BMX bikes and mountain bikes have proven ideally suited for such things as riding over jumps, negotiating uneven terrain, and performing aerial stunts. Trick bike competitions feature riders on BMX bikes performing all sorts of flips, twists and other maneuvers over wooden jumps, in wooden half-pipes and concrete surfaces. It would be desirable if a snowbike could be fashioned which would be structurally sound enough so as to permit a rider to accomplish similar feats on snow, such as within the boundaries of a snowboard park characterized by jumps, half-pipes and boarder cross courses.

Accordingly, those skilled in the art have long recognized the need for an inexpensive way to allow cycling enthusiasts to be able to engage in extreme snow-terrain biking activities that are similar to the extreme activities engaged in by the riders of BMX bikes and mountain bikes. The present invention clearly fulfills these and other needs.

SUMMARY OF THE INVENTION

Briefly, and in general terms, the present invention resolves the above and other problems by providing a bicycle ski link assembly for converting a standard bicycle into a snowbike by connecting snow-engaging ski members to the bicycle frame. The bicycle ski link assembly includes two ski link brackets. Each ski link bracket has an upper portion that is configured to selectively attach to the frame, and a base portion that is configured to selectively attach to a snow-engaging ski member.

In accordance with one aspect of the present invention, the upper portion of each ski link bracket preferably is configured to attach to a wheel mount of the frame via an axle. The axles are then bolted to the bicycle frame and forks in exactly the same manner as bicycle wheels are attached to the bicycle frame. In one embodiment, the foot pegs are configured to attach to the cylindrical wheel cranks mount of the bicycle frame. Preferably, the foot pegs connect to the bicycle frame using a bolt that is positioned where a crank spindle usually is mounted. Further, in one embodiment of the present invention, the base portion of each ski link bracket contains a standard hole pattern that is used to selectively attach the ski link bracket to a snow-engaging ski member.

In accordance with another aspect of the present invention, each ski link bracket is selectively mountable directly to a corresponding snow-engaging ski member. In one embodiment of the present invention, each snow-engaging ski member is a short trick ski, which is typically referred to as a ski board. In another embodiment of the present invention, each snow-engaging ski member is a short, children's ski. In still another embodiment of the present invention, each snow-engaging ski member is an adult ski that has been cut off or otherwise truncated.

In accordance with yet another aspect of the present invention, each ski link bracket further comprises a biasing system that is designed to level out an attached snow-engaging ski member when the snowbike is airborne. Preferably, the biasing system in each ski link bracket is a spring-based biasing system. In some embodiments of the present invention, spring-biasing systems are internal within the ski link brackets; while in other embodiments of the present invention, the spring-biasing systems are external of the ski link brackets. In still other embodiments of the present invention, the biasing systems utilize torsion springs or elastomeric materials.

Another preferred embodiment of the present invention is directed towards a snowbike conversion kit for modifying a standard bicycle into a snowbike. The snowbike conversion kit facilitates replacing the wheels of the standard bicycle with snow-engaging ski members. The snowbike conversion kit includes ski link brackets and foot pegs. Each ski link bracket has an upper portion that is configured to selectively attach to the frame of the bicycle after removal of the wheels from the frame. Preferably, the upper portion of each ski link bracket attaches to a wheel mount on the frame via an axle. Additionally, each ski link bracket has a base portion that is configured to operatively associate with a snow-engaging ski member. The foot pegs are configured to attach to the frame after removal of the wheel cranks assembly from the frame. In one embodiment of the present invention, each ski link bracket is configured to operatively associate with a snow-engaging ski member via a binding. In another embodiment of the present invention, the ski link brackets are directly connected to the snow-engaging ski members.

Another preferred embodiment of the present invention is directed towards a method for converting a standard bicycle into a snowbike. The method includes: removing the wheels from the bicycle; removing the wheel cranks from the bicycle; attaching two ski link brackets to the bicycle frame; and attaching a snow-engaging ski member to each ski link bracket. More particularly, the method of converting a standard bicycle into a snowbike is achieved by attaching foot pegs to the bicycle frame. Preferably, the method of attaching foot pegs to the bicycle frame comprises attaching foot pegs to the cylindrical wheel cranks mount of the bicycle frame.

Other features and advantages of the present invention will become apparent from the following detailed description, taken in conjunction with the accompanying drawings, which illustrate by way of example, the features of the present invention.

DETAILED DESCRIPTION OF THE PREFERRED EMBODIMENTS

Figure 1:
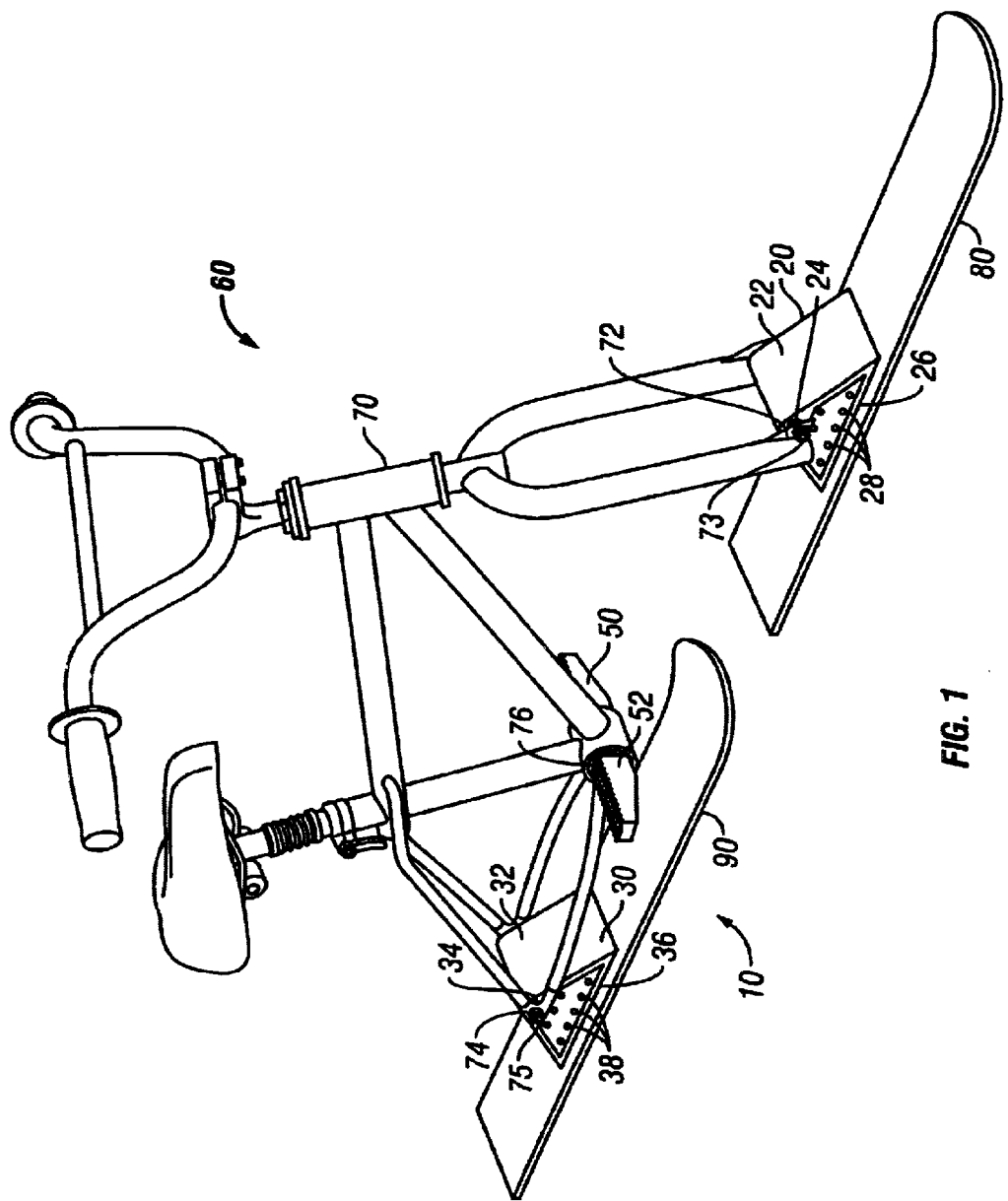
FIG. 1 illustrates a perspective view of a standard bicycle that has been converted into a snowbike using two ski link brackets and two foot pegs, in accordance with the present invention.

A preferred embodiment of the present invention is a bicycle ski link assembly for converting a standard bicycle into a snowbike by connecting snow-engaging ski members to the bicycle frame. The bicycle ski link assembly is an inexpensive means by which a cycling enthusiast can reconfigure a standard bicycle so as to be able to use the equipment on snow-covered terrain, such as in snowboard-type parks and the like, in a manner similar to the manner in which the standard bicycle can be used on nonsnow-covered terrain.

Referring now to the drawings, wherein like reference numerals denote like or corresponding parts throughout the drawings, and more particularly to FIGS. 1–4, there is shown a bicycle ski link assembly according to the present invention. Briefly stated, a preferred embodiment of the present invention provides a bicycle ski link assembly 10 that includes front and rear ski link brackets 20, 30, and left and right foot pegs 50, 52, respectively. Each of the two ski link brackets 20, 30 has an upper portion 22, 32 and a lower base portion 26, 36. The upper portion 22, 32 of each ski link bracket 20, 30 contains a transverse axle hole 24, 34. Further, the lower base portion 26, 36 of each ski link bracket 20, 30 contains a set of ski member holes 28, 38.

In a preferred embodiment of the present invention, the ski link brackets 20, 30 and the foot pegs 50, 52 attach to a standard bicycle. The frame 70 of the bicycle includes a front wheel mount 72, a rear wheel mount 74, and a wheel cranks mount 76. In order to convert the standard bicycle into a snowbike 60, the front and rear wheels of the bicycle (not shown) are removed. Additionally, the wheel cranks (not shown) are removed from the cylindrical wheel cranks mount 76. The ski link brackets 20, 30 of the bicycle ski link assembly 10 then are secured to the frame 70 by attaching the upper portions 22, 32 of the ski link brackets to the wheel mounts 72, 74 of the frame by inserting axles 73, 75 through the axle holes 24, 34 in the ski link brackets. The axles 73, 75 are configured to selectively house in the wheel mounts 72, 74, respectively. The left and right foot pegs 50, 52 are then attached to the wheel cranks mount 76. In one embodiment, the foot pegs 50, 52 connect to the frame 70 using a bolt that is positioned where a crank spindle is usually mounted.

In a preferred embodiment of the bicycle ski link assembly 10, the front and rear ski link brackets 22, 32 attach to front and back ski members 80, 90. A set of mounting holes (not shown) are provided on the upper surface of each of the ski members 80, 90. The sets of ski member attachment holes 28, 38 on the lower base potions 26, 36 of the ski link brackets 20, 30 are configured to align with the sets of mounting holes on the ski members 80, 90. This allows the ski link brackets 20, 30 to be securely fastened to the ski members 80, 90 by bolting or screwing through the ski attachment holes 28, 38 of the ski link brackets 20, 30 and the mounting holes of the ski members 80, 90. In another preferred embodiment of the present invention, the ski link brackets 20, 30 are not fastened directly to the ski members 80, 90, but rather the ski link brackets 20, 30 are indirectly connected to the ski members 80, 90 through bindings (as is commonly done with standard snow skis), or through some other connecting mechanism.

Figure 3:
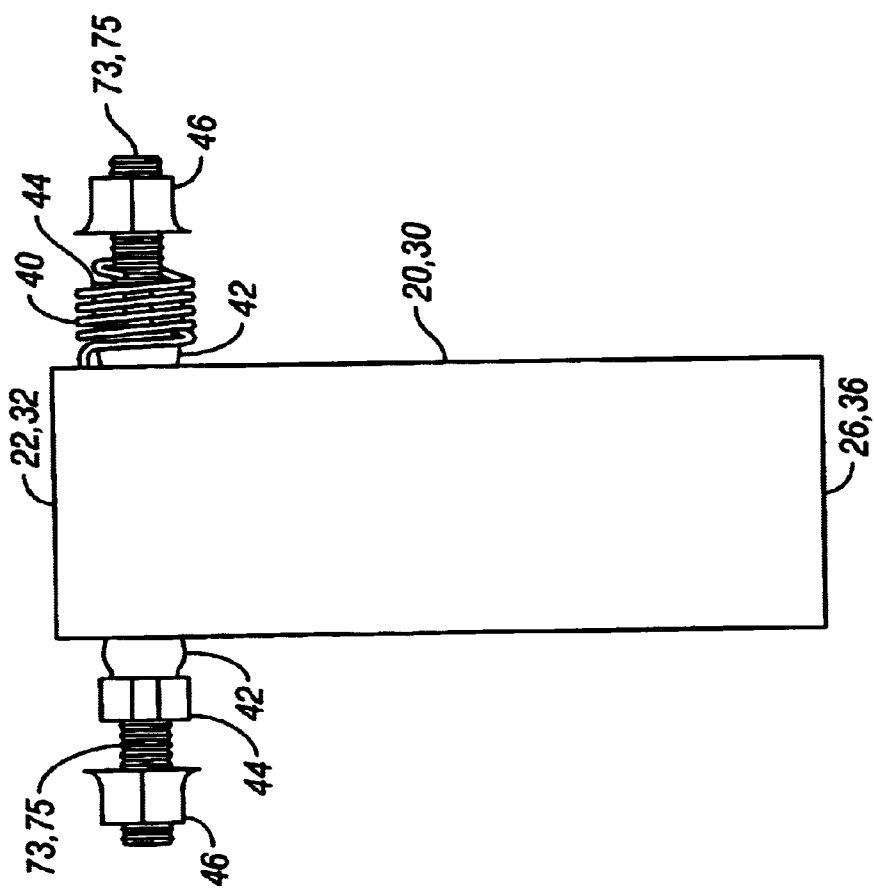
FIG. 3 illustrates a front view of the ski link bracket of FIG. 2.
Figure 2:
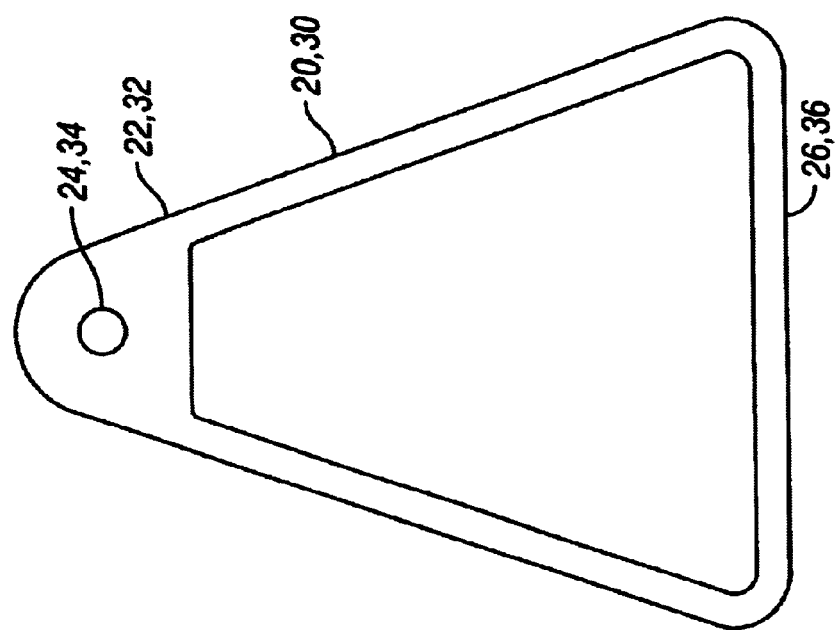
FIG. 2 illustrates a side view of the ski link bracket for converting a standard bicycle into a snowbike.

Referring now to FIGS. 1–3 (and more specifically to FIG. 3), one of the ski link brackets 20, 30 of the bicycle ski link assembly 10 is shown with a corresponding axle 73, 75 housed within the axle hole 24, 34. The axle 73, 75 extends from the axle hole 24, 34 on each side of the ski link bracket 20, 30, and is secured to the ski link bracket with standard bearing nuts 42, lock nuts 44, and axle nuts 46. On one side of the ski link bracket 20, 30, a torsion spring 44 is wrapped around the extending portion of the axle 73, 75. The torsion spring 40 acts to keep the ski link bracket 20, 30 and the attached ski member 80, 90, in approximately the same position when the snowbike 60 is airborne, as when the snowbike is in contact with the ground. This serves to keep the ski member 80, 90 in a desirable position when the snowbike 60 and its rider land on the snow after being airborne. Without such a mechanism the one or both of the ski members 80, 90 could "nose" tip down (with respect to the remainder of the snowbike 60), thereby dramatically increasing the chances that the rider will crash upon landing. In another preferred embodiment of the bicycle ski link assembly 10, other types of biasing systems are utilized in place of the torsion springs 40, in order to maintain airborne alignment of the ski members 80, 90. These other biasing systems include, by way of example only, and not by way of limitation, longitudinal springs, internal spring systems, and elastomeric biasing systems.

In one preferred embodiment of the present invention, the bicycle ski link assembly 10 employs ski link brackets 20, 30 that are composed of a metallic material, preferably an aluminum alloy. However, in other preferred embodiments of the present invention, the ski link brackets 20, 30 are composed of wood, hardened plastics, or other suitable composite materials. In a preferred embodiment, the pair of left and right foot pegs 50, 52 that attach to the wheel cranks mount 76 also are metal, and are similar to those found on motocross dirt bikes.

As shown in FIG. 2, the ski link brackets 20, 30 are substantially triangular in configuration. The height, length, and width dimensions of the ski link brackets 20, 30 vary in magnitude between different preferred embodiments of the present invention. For example, the height of the ski link brackets 20, 30 should be tall enough to prevent bottoming out of the foot pegs 50, 52, especially in snowbikes 60 designed for small radius turning. Additionally, substantial increases in the height of ski link brackets 20, 30 are useful in conjunction with some specific types of snowbike 60 tricks and activities. However, increased height can also make the snowbike 60 more difficult to ride due to balance considerations. Regarding the width dimension, wider ski link brackets 20, 30 allow for more extreme movements and greater maneuverability, while narrower ski link brackets 20, 30 provide greater stability and speed. Regarding the length dimension, typically the length of the ski link brackets 20, 30 is desired to be reasonably short so that the ski members 80, 90 to which the ski link brackets 20, 30 are mounted, have sufficient ability to flex. In one specific preferred embodiment of the present invention, the ski link brackets 20, 30 are approximately 6 inches tall, approximately 5 inches long, and approximately 2¼ inches wide.

Figure 4:
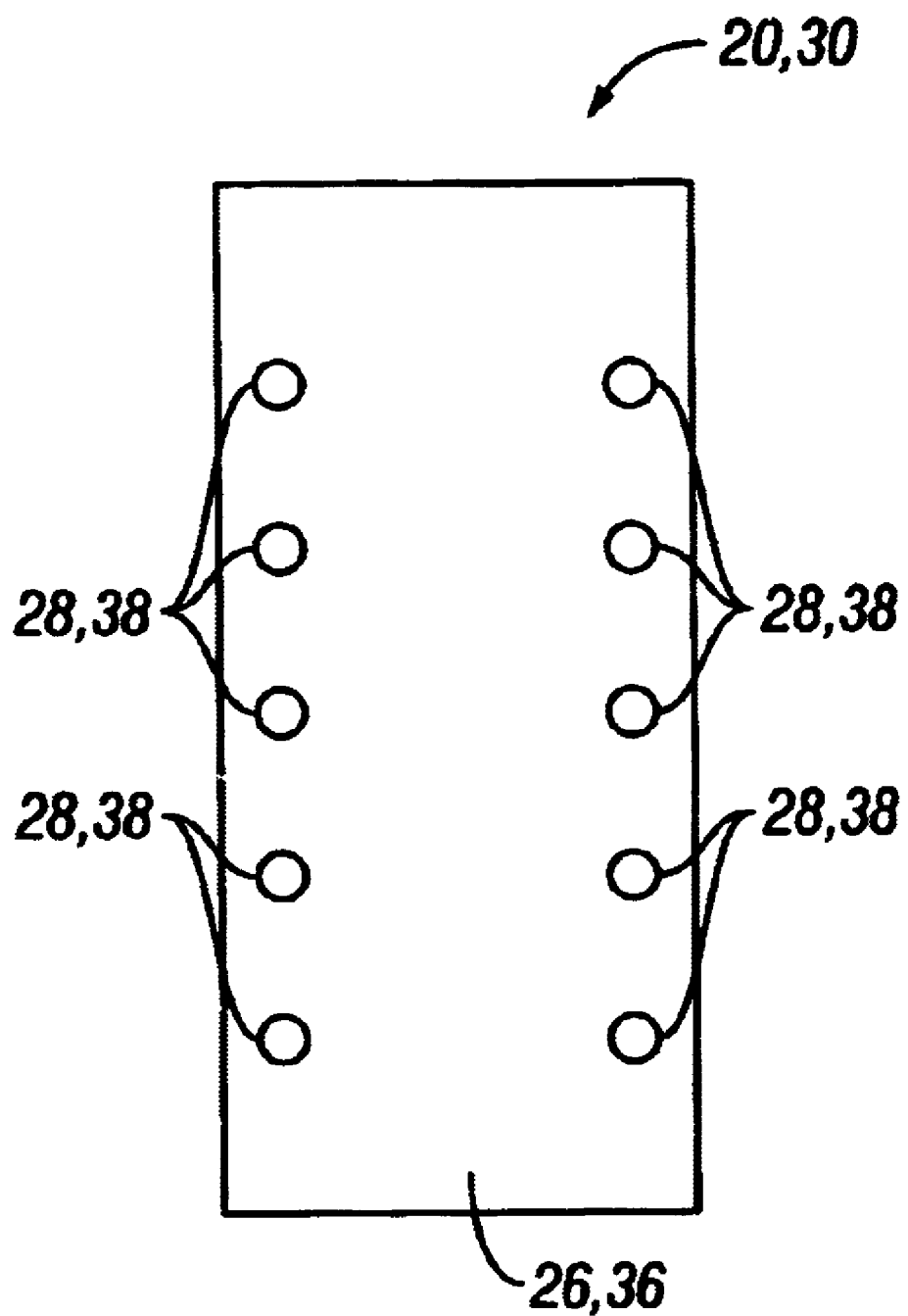
FIG. 4 illustrates a bottom view of the ski link bracket of FIG. 2.

As described above, the lower base portion 26, 36 of each ski link bracket 20, 30 contains a set of ski member attachment holes 28, 38. In one exemplary embodiment of the bicycle ski link assembly 10, the sets of attachment holes 28, 38 each include ten holes, each attachment hole being ¼ inches in diameter. Preferably, the attachment holes are countersunk. As shown in FIG. 4, each set of attachment holes 28, 38 is arranged as two columns of five holes running the length of the ski link brackets 20, 30. Preferably, the two columns are approximately 4 centimeters apart (measured off center point) with each row of holes being spaced two centimeters apart, along the length of the ski link brackets 20, 30. In one preferred embodiment of the present invention, the ski members 80, 90 are ski boards. Ski boards are short, twin-tipped, trick skis that are popular for use in snowboard parks. The spacing is designed so that 4-hole patterns from among the set of ten attachment holes 28, 38 match the spacing of the standard 4-hole pattern on most ski boards. This hole alignment allows the user to simply remove the bindings from the ski boards, and bolt the ski boards directly to the ski link brackets 20, 30.

In another preferred embodiment of the ski link assembly 10, the ski members 80, 90 to which the ski link brackets 20, 30 mount are short, children's skis (approximately 90 centimeters long). The mounting is accomplished in the same manner as mounting normal bindings on skis. Specifically, the ski members are top-drilled and the ski link brackets 20, 30 are screwed into place using binding mount screws. An advantage of this embodiment is that children's skis are narrower, and thus, more stable than the wider ski boards. Furthermore, children's skis are less expensive than ski boards (presently $50–$100 versus $150–$400). Children's skis are better for stable, easy, fast, all-mountain riding, while the ski boards are better for surface tricks and maneuverability.

In still another preferred embodiment of the present invention, the ski link brackets 20, 30 of the ski link assembly 10 are mounted onto an old pair of adult sized skis that are cut (from the tails of the skis) to the desired length. The ski link brackets 20, 30 are mounted to these truncated adult skis, as described above. In yet another preferred embodiment of the present invention, the ski link brackets 20, 30 are pre-mounted to the ski members 80, 90. Another embodiment of the present invention utilizes a taller version of the ski link brackets 20, 30. Instead of employing an axle that is 6 inches high, these ski link brackets 20, 30 employ an axle that is 13 inches high, which is the same as on a 26 inch mountain bike wheel.

A preferred embodiment ski link assembly 10, constructed in accordance with the present invention, marries the sports of cycling and snowboarding, both of which are growing rapidly in popularity. Additionally, anyone who races BMX or mountain bikes already has the bike and all of the protective gear (e.g., helmet, pads, and the like) required to race or compete with these snowbikes 60. Further, the snowbike 60 of the present invention is very easy to ride. It is virtually as easy as riding a bicycle. To stop, the user simply either (1) turns the snowbike 60 across the hill, (2) slides the back end of the snowbike 60 sideways and skids to a stop, or (3) just puts his or her feet down. Advantageously, a preferred embodiment snowbike 60 of the present invention is much easier to control than a snowboard or skis. Thus, the snowbike 60 of the present invention is likely to appeal to a wider group of individuals, since it does not require the athletic ability of skiing or snowboarding. The snowbike 60 can be used in a relaxed fashion while cruising down the mountain, or in a challenging manner while jumping in a snowboard park.

In a preferred embodiment bicycle ski link assembly 10, the snowbike 60 conversion kit provides an inexpensive technique for allowing anyone who owns a bicycle of any kind, to convert that bicycle into a snowbike 60. All that must be done is to remove the wheels and wheel cranks assembly from the bicycle, replace the wheels with ski members 80, 90, and replace the wheel cranks assembly with the foot pegs 50, 52. The snowbikes 60 of the present invention are extremely versatile, and can be ridden in snowboard parks, on jumps, in half-pipes, and on boarder cross courses. BMX bikes and mountain bikes are ideally suited to be converted into snowbikes 60, because they are lightweight and extremely durable. BMX bikes and mountain bikes have been successfully used in trick bike competitions to perform every kind of flip, twist, and trick over wooden jumps, on concrete, and in wooden half-pipes. The ski link assembly 10 of the present invention allows these tricks to be performed by snowbikes 60 on the softer, more forgiving surface of the snow.

Furthermore, the various apparatus and methodologies described above are provided by way of illustration only and should not be construed to limit the invention. Those skilled in the art will readily recognize various modifications and changes may be made to the present invention without departing from the true spirit and scope of the present invention. Accordingly, it is not intended that the invention be limited, except as by the appended claims.

What is claimed is:

1. A bicycle ski link assembly for converting a bicycle having a frame into a snowbike without a drive system by connecting snow-engaging ski members to the frame, the bicycle further including wheel mounts and a wheel cranks mount, the bicycle ski link assembly comprising:

a front ski link bracket and a single, centrally mounted, rear ski link bracket, each ski link bracket having an upper portion and a base portion, wherein each upper portion is configured to selectively attach to the frame, and each base portion is configured to selectively attach to a snow-engaging ski member.

2. The bicycle ski link assembly of claim 1, wherein the upper portion of each ski link bracket is configured to attach to a wheel mount of the frame via an axle.

3. The bicycle ski link assembly of claim 1, further comprising foot pegs that are configured to attach to the wheel cranks mount of the frame.

4. The bicycle ski link assembly of claim 3, wherein the frame includes a crank spindle and an aperture for housing the crank spindle, and wherein the foot pegs connect to the frame using a bolt that is positioned in the aperture after removal of the crank spindle.

5. The bicycle ski link assembly of claim 1, wherein each base portion contains a hole pattern that is used to selectively attach a ski link bracket to a snow-engaging ski member.

6. The bicycle ski link assembly of claim 1, wherein each ski link bracket further comprises an axle-mounted spring biasing system designed to level out an attached snow-engaging ski member when the snowbike is airborne.

7. The bicycle ski link assembly of claim 1, wherein each ski link bracket further comprises a torsion spring biasing system designed to level out an attached snow-engaging ski member when the snowbike is airborne.

8. The bicycle ski link assembly of claim 1, wherein each ski link bracket is selectively mountable to a corresponding snow-engaging ski member, and wherein each snow-engaging ski member comprises a ski board.

9. The bicycle ski link assembly of claim 1, wherein each ski link bracket is selectively mountable to a corresponding snow-engaging ski member, and wherein each snow-engaging ski member comprises a short children's ski.

10. The bicycle ski link assembly of claim 1, wherein each ski link bracket is selectively mountable to a corresponding snow-engaging ski member, and wherein each snow-engaging ski member comprises a truncated, adult ski.

11. A snowbike conversion kit for modifying a bicycle having wheels into a snowbike without a drive system by replacing the wheels with snow-engaging ski members and removing any previously existing drive system, the bicycle further including a frame, two wheel mounts, wheel cranks assembly, and a wheel cranks mount, the snowbike conversion kit comprising:

a front ski link bracket and a single, centrally mounted, rear ski link bracket, each ski link bracket having an upper portion and a base portion, wherein each upper portion is configured to selectively attach to the frame after removal of the wheels from the frame, and wherein each base portion is configured to operatively associate with a snow-engaging ski member; and foot pegs configured to attach to the frame after the wheel cranks assembly is removed from the wheel cranks mount.

12. The snowbike conversion kit of claim 11, wherein the upper portion of each ski link bracket is configured to attach to a wheel mount of the frame via an axle.

13. The snowbike conversion kit of claim 11, wherein the foot pegs are configured to attach to the wheel cranks mount.

14. The snowbike conversion kit of claim 11, wherein the frame includes a crank spindle and an aperture for housing the crank spindle, and wherein the foot pegs connect to the frame using a bolt that is positioned in the aperture after removal of the crank spindle.

15. The snowbike conversion kit of claim 11, wherein each base portion contains a hole pattern that is used to selectively attach a ski link bracket to a snow-engaging ski member.

16. The snowbike conversion kit of claim 11, wherein each ski link bracket further comprises an axle-mounted spring biasing system designed to level out an attached snow-engaging ski member when the snowbike is airborne.

17. The snowbike conversion kit of claim 11, wherein each ski link bracket further comprises a torsion spring biasing system designed to level out an attached snow-engaging ski member when the snowbike is airborne.

18. The snowbike conversion kit of claim 11, wherein each ski link bracket is selectively mountable to a corresponding snow-engaging ski member, and wherein each snow-engaging ski member comprises a ski board.

19. The snowbike conversion kit of claim 11, wherein each ski link bracket is selectively mountable to a corresponding snow-engaging ski member, and wherein each snow-engaging ski member comprises a short, children's ski.

20. The snowbike conversion kit of claim 11, wherein each ski link bracket is selectively mountable to a corresponding snow-engaging ski member, and wherein each snow-engaging ski member comprises a truncated adult ski.

21. A bicycle ski link assembly for converting a bicycle having a frame into a snowbike by connecting snow-engaging ski members to the frame, the bicycle further including wheel mounts and a wheel cranks mount, the bicycle ski link assembly comprising:

two ski link brackets, each ski link bracket having an upper portion and a base portion, wherein each upper portion is configured to selectively attach to the frame, and each base portion is configured to selectively attach to a snow-engaging ski member, and wherein each ski link bracket further comprises a torsion spring biasing system mounted about an axle that levels out an attached snow-engaging ski member when the snowbike is airborne.

22. A snowbike conversion kit for modifying a bicycle having wheels into a snowbike by replacing the wheels with snow-engaging ski members, the bicycle further including a frame, two wheel mounts, wheel cranks assembly, and a wheel cranks mount, the snowbike conversion kit comprising:

two ski link brackets, each ski link bracket having an upper portion and a base portion, wherein each upper portion is configured to selectively attach to the frame after removal of the wheels from the frame, wherein each base portion is configured to operatively associate with a snow-engaging ski member; and wherein each ski link bracket further comprises a torsion spring biasing system mounted about an axle that levels out an attached snow-engaging ski member when the snowbike is airborne.

* * * * *